(12) United States Patent
Lee

(10) Patent No.: US 7,391,817 B2
(45) Date of Patent: Jun. 24, 2008

(54) METHOD AND APPARATUS FOR DETERMINING ANTENNA WEIGHT IN A CLOSED-LOOP TRANSMIT DIVERSITY SYSTEM

(75) Inventor: Ye-Hoon Lee, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 643 days.

(21) Appl. No.: 10/858,617

(22) Filed: Jun. 2, 2004

(65) Prior Publication Data
US 2004/0252797 A1    Dec. 16, 2004

(30) Foreign Application Priority Data
Jun. 13, 2003    (KR)    ............... 10-2003-0038390

(51) Int. Cl.
*H04L 1/02* (2006.01)
(52) U.S. Cl. ............... 375/267; 375/260; 375/347; 455/132; 455/296; 455/504; 455/522
(58) Field of Classification Search ............... 375/220, 375/267, 347, 260; 455/101, 67.13, 132, 455/296, 504, 522
See application file for complete search history.

(56) References Cited

U.S. PATENT DOCUMENTS 6,865,237 B1 *   3/2005   Boariu et al. ............... 375/295
6,922,549 B2 *   7/2005   Lyons et al. ............... 455/67.13
7,206,554 B1 *   4/2007   Lindskog ............... 455/101
2003/0017835 A1   1/2003   Bergel ............... 455/502
2003/0035491 A1   2/2003   Walton et al. ............... 375/267
2005/0020237 A1 *   1/2005   Alexiou et al. ............... 455/403

FOREIGN PATENT DOCUMENTS

DE    101 31 946    7/2001
WO    WO 03/009492    1/2003

OTHER PUBLICATIONS

3rd Generation Partnership Project; Technical Specification Group Radio Access Network; Tx Diversity Solutions for Multiple Antennas (Release 5), Jun. 2001, pp. 1-36.

* cited by examiner

*Primary Examiner*—Shuwang Liu
*Assistant Examiner*—Helene Tayong
(74) *Attorney, Agent, or Firm*—The Farrell Law Firm, PC

(57) ABSTRACT

A method and apparatus for adaptively determining weights for transmission antennas according to a channel condition in a closed-loop transmit diversity system using a plurality of transmission antennas. The antenna weights are determined using variation of channel characteristics based on time and space, to thereby improve bit error rate performance. Parameters for fixing average transmission power per symbol according to the statistical channel characteristics for symbol energy and additive white Gaussian nose energy are previously determined to estimate channel characteristics. The antenna weights are determined using the parameters and channel gains estimated upon reception of data symbols.

8 Claims, 4 Drawing Sheets

METHOD AND APPARATUS FOR DETERMINING ANTENNA WEIGHT IN A CLOSED-LOOP TRANSMIT DIVERSITY SYSTEM

PRIORTY

This application claims priority under 35 U.S.C. §; 119 to an application entitled "Method and Apparatus for Determining Antenna Weight in a Closed-Loop Transmit Diversity System" filed in the Korean Intellectual Property Office on Jun. 13, 2003 and assigned Serial No. 2003-38390, the contents of which are incorporated herein by reference.

BACKGROUND OF THE INVENTION

1. Field of the Invention

The present invention relates generally to a closed-loop transmit diversity system using a plurality of transmission antennas, and in particular, to a method and apparatus for adaptively determining weights of respective antennas according to a condition of channels.

2. Description of the Related Art

Transmit diversity is an effective technology for relieving degradation of a signal due to fading in a wireless communication system. In the transmit diversity technology, a transmitter transmits desired transmission data via a plurality of transmission antennas so that a receiver can receive data in a stable manner.

FIG. 1 is a block diagram illustrating a simplified baseband structure of a closed-loop transmit diversity system having M transmission antennas. Here, "closed-loop" means that a transmitter uses information fed back from a receiver in transmitting data via a plurality of transmission antennas.

As illustrated, in a transmitter 100, a modulator 110 receives a bit stream including desired transmission information and generates a data symbol d having symbol energy $E_s$ according to a predetermined modulation scheme. M multipliers 120, 122 and 124 multiply the data symbol d by weights $w_1, w_2, \ldots, W_M$ assigned to corresponding antennas, and provide their outputs to M transmission antennas 130, 132 and 134. The M transmission antennas 130, 132 and 134 radiate the weighted data symbols $dw_m$ to the air.

In a receiver 140, a reception antenna 150 receives a radio signal from the transmitter 100. An adder 160 indicates that an additive white Gaussian noise (AWGN) is added while the receiver 140 receives the radio signal. The radio signal includes a previously known pilot together with the data transmitted by the transmitter 100. A channel estimator 170 calculates channel gains h1, h2, . . . , $h_M$ indicating channel impulse response characteristics of the receiver 140, from the M transmission antennas 130, 132 and 134, using the pilot. The data excluding the pilot is provided to a demodulator 180 so as to restore its original information.

An antenna weight determiner 190 calculates antenna weights $w_1, w_2, \ldots, W_M$ using the calculated channel gains $h_1, h_2, \ldots, h_M$, and the calculated antenna weighs are transmitted to the transmitter 100 over a feedback channel 10, using undepicted transmission elements.

In the transmit diversity system constructed in this way, a procedure for calculating antenna weights for the transmission antennas 130, 132 and 134 by the antenna weight determiner 190 is performed as follows. First, a received signal in a receiver is expressed as shown in Equation (1):

$$r = \sum_{m=1}^{M} \sqrt{E_s}\, dw_m h_m + n \qquad (1)$$

Here, r is a received signal, m is a transmission antenna index, M is the number of transmission antennas, $E_s$ is symbol energy used in a transmitter, and d is a data symbol. When d is a binary data symbol, $E_s$ is equal to bit energy $E_b$. In addition, $w_m$ is a weight assigned to an $m^{th}$ antenna, $h_m$ is a channel characteristic from an $m^{th}$ transmission antenna to the receiver, and n is a channel noise.

If a data symbol d is a binary data symbol having the same probability of d=+1 and d=−1, an instantaneous signal-to-noise ratio (SNR) of a received signal is given as shown in Equation (2):

$$\gamma = \frac{E_s \left| \sum_{m=1}^{M} w_m h_m \right|^2}{N_o} \qquad (2)$$

Here, $N_o$ is AWGN energy. In order to maximize SNR, antenna weights are determined in accordance with Equation (3) below (see R. T. Derryberry, S. D. Gray, D. M. Ionescu, G. Mandyam, and B. Raghothaman, "Transmit Diversity in 3G CDMA System," IEEE Commun. Mag., pp. 68-75, April 2002).

$$w_m = \frac{h_m^*}{\sqrt{\sum_{m=1}^{M} |h_m|^2}} \qquad (3)$$

Here, $h_m^*$ means a complex conjugate of the channel characteristic.

FIG. 2 is a block diagram illustrating a detailed structure of the antenna weight determiner 190 according to the prior art. As illustrated, complex conjugate generators 191-1 to 191-M calculate conjugates of channel gains $h_1, \ldots, h_M$, and power gain acquisition sections 192-1 to 192-M calculate channel power gains by squaring absolute values of the channel gains. A summer 193 sums up the channel power gains, a square root generator 194 calculates a square root of the summed channel power gain, and a reciprocal generator 195 calculates a reciprocal of the square root. Multipliers 196-1 to 196-M calculate weights $w_1, \ldots, w_M$ by multiplying the conjugates of the channel gains by the reciprocal of the square root.

In the conventional weight determining method described above, power consumed during transmission of data symbols is normalized so that the power is always constant. That is, during transmission of each data symbol, the sum of power gains of antenna weights always becomes 1, so the SNR of a received signal is maximized by distributing transmission power according to spaces (antennas). This conventional technology considers only a space variation characteristic among time and space (antenna) variation characteristics of channels. Thus, the conventional technology fails to minimize an average bit error rate (BER) serving as an important criterion for performance evaluation.

SUMMARY OF THE INVENTION

It is, therefore, an object of the present invention to provide a method and apparatus for determining an antenna weight considering a radio channel characteristic which varies according to time and space in a closed-loop transmit diversity system.

It is another object of the present invention to provide a method and apparatus for determining an antenna weight for minimizing an average bit error rate while fixing average transmission power in a closed-loop transmit diversity system.

To achieve the above and other objects, the invention provides a method for determining antenna weights for M transmission antennas in a closed-loop transmit diversity system. The method comprises the steps of estimating channel gains from the M transmission antennas to a receiver; and determining antenna weights for the M transmission antennas by using the estimated channel gains and parameters previously determined so as to fix average transmission power per transmission symbol from the M transmission antennas.

To achieve the above and other objects, the invention also provides an apparatus for determining antenna weights for M transmission antennas in a closed-loop transmit diversity system. The apparatus comprises a channel estimator for estimating channel gains from the M transmission antennas to a receiver; and an antenna weight determiner for determining antenna weights for the M transmission antennas by using the estimated channel gains and parameters previously determined so as to fix average transmission power per transmission symbol from the M transmission antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness. The terms used herein will be defined considering their functions in the invention and can be changed according to users, intentions of the users, or usual practices. Therefore, a definition of a term is based on the entire contents of the specification.

The invention determines a weight of an antenna according to a channel condition and average transmission power per symbol at an operation time. An antenna weight is determined so as to satisfy a restriction condition of average transmission power and based on channel information of channels formed from transmission antennas to a receiver.

Figure 1:
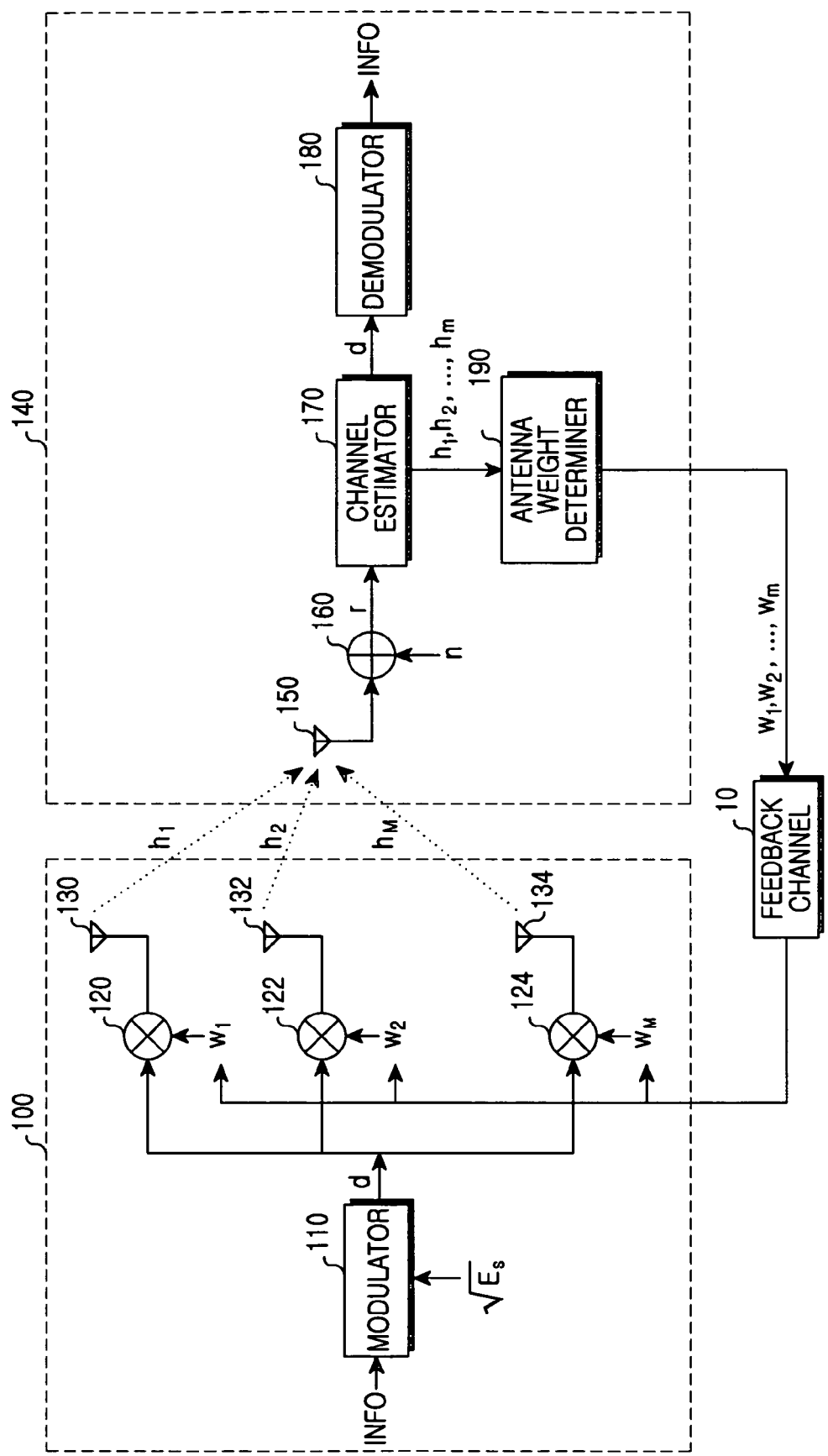
FIG. 1 is a block diagram illustrating a simplified baseband structure of a general closed-loop transmit diversity system.
Figure 2:
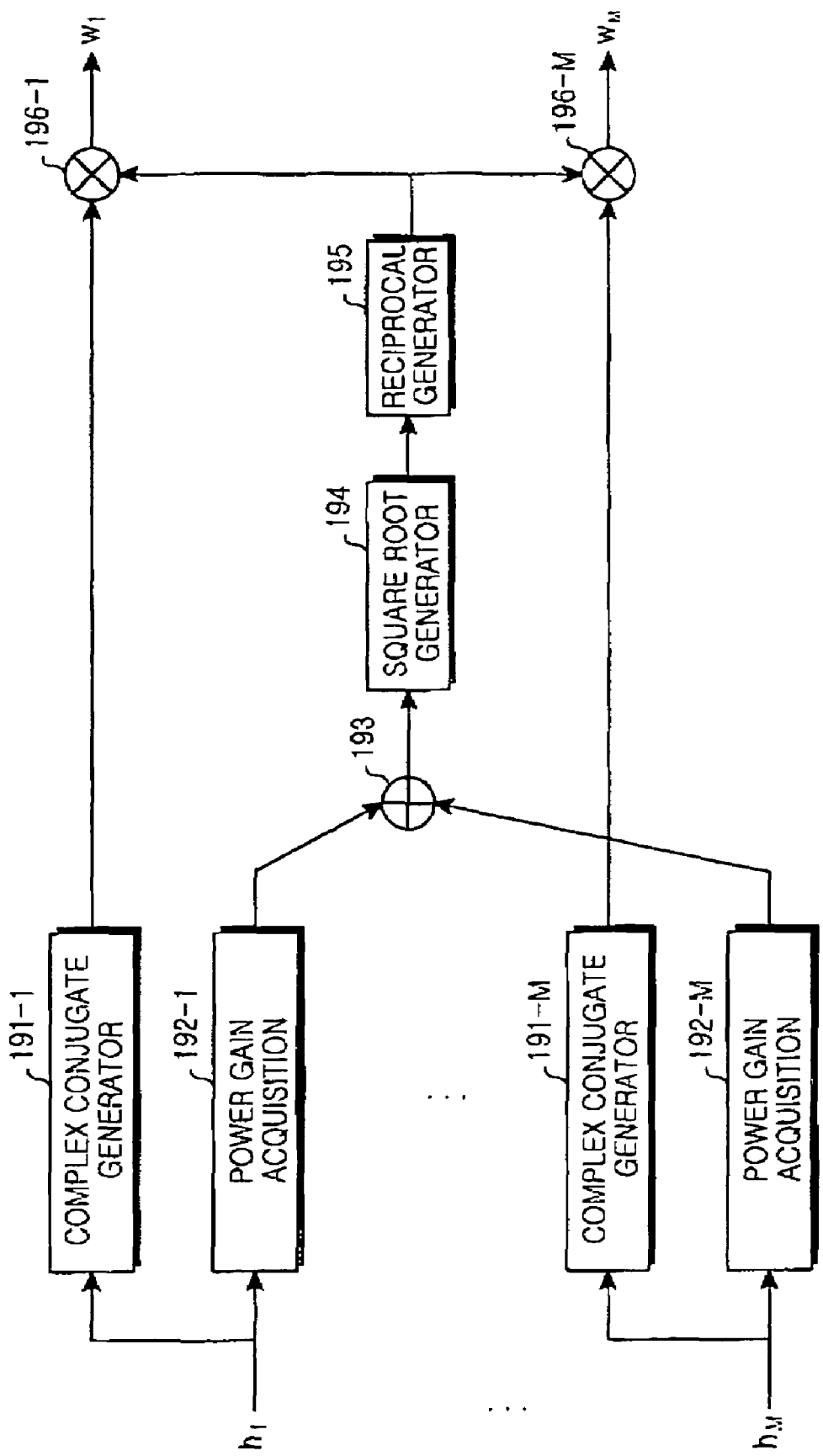
FIG. 2 is a block diagram illustrating a detailed structure of the antenna weight determiner according to the prior art.

A structure of a transmit diversity system to which the present invention is applied has already been described in FIG. 1. In particular, the invention relates to an operation of the antenna weight determiner 190 in the closed-loop transmit diversity system of FIG. 1. That is, the antenna weight determiner 190 according to the present invention determines an antenna weight so as to minimize an average bit error rate of a plurality of data symbols, instead of maximizing the SNR of every data symbol.

An average bit error rate in a closed-loop transmit diversity system can be expressed as shown in Equation (4):

$$P_b = \underset{h_1, h_2, \ldots h_M}{E} [Q(2\gamma)] \tag{4}$$

Here, $P_b$ is a probability density function indicating an average bit error rate for channel gains $h_1$, $h_2$, ..., $h_M$ representing channel impulse response characteristics, from M transmission antennas to a receiver, and E means an average function. In addition, Q( ) is a known function defined as in Equation (5):

$$Q(x) = \frac{1}{\sqrt{2\pi}} \int_x^\infty e^{-t^2/2} dt, \quad x \geq 0 \tag{5}$$

$Q(2\gamma)$ means an instantaneous bit error rate, and monotonically decreases as an instantaneous SNR $\gamma$ of a received signal is increased.

Average transmission power per symbol is represented by $$E\left[\sum_{m=1}^{M} |w_m|^2\right],$$

and minimizing an average bit error rate when the average transmission power is fixed is equivalent to calculating Equation (6) below:

$$\underset{w_1, w_2, \ldots w_M}{\min} \{P_b = E[Q(\sqrt{2\gamma})]\} \tag{6}$$

$$E\left[\sum_{m=1}^{M} |w_m|^2\right] = 1$$

Here, E[ ] is an average function. Equation (6) above means calculating antenna weights $w_1, w_2, \ldots, w_M$ that minimize a formula in { }. For the convenience of calculation, it is assumed herein that the average transmission power is fixed to 1.

Then, as set forth in Equation (7), the restriction condition of average transmission power being fixed to 1 is identical to $$E\left[\sum_{m=1}^{M} |w_m|^2\right] = 1 \Leftrightarrow \sum_{m=1}^{M} |w_m|^2 = \alpha, \quad E[\alpha] = 1 \tag{7}$$

Here, $\alpha$ represents an amount of transmission power used per symbol transmission in a time domain. Referring to Equation (8), according to the Cauchy-Schwartz inequality, SNR is restricted by $$\gamma \leq \frac{E_s\left(\sum_{m=1}^{M} |w_m|^2\right)\left(\sum_{m=1}^{M} |h_m|^2\right)}{N_o} = \frac{\alpha E_s \sum_{m=1}^{M} |h_m|^2}{N_o} \tag{8}$$

In Equation (8), in order for SNR to be maximized, Equation (9) below should be satisfied.

$$w_m = \frac{\sqrt{\alpha}\, h_m^*}{\sqrt{\sum_{m=1}^{M} |h_m|^2}}, \quad m = 1, 2, \ldots M \qquad (9)$$

Since Q( ) is a monotonically decreasing function, if antenna weights are determined by Equation (9), instantaneous SNR is maximized for a given $\alpha$, and as a result, an instantaneous bit error rate is minimized.

Then, minimizing an average bit error rate when average transmission power is fixed can be expressed with a simpler formula given in Equation (10):

$$\min_{\alpha}\left\{ P_b = \int_0^{\infty} Q\left(\sqrt{\frac{2\alpha g E_s}{N_o}}\right) P_G(g)\, dg \right\} \qquad (10)$$

$$E|\alpha| = \int_0^{\infty} \alpha P_G(g)\, dg = 1$$

Here, g or G is $$\sum_{m=1}^{M} |h_m|^2$$

and is the sum of channel gains representing channel characteristics of transmission antennas. A probability density function $P_G(\ )$ of the G can be previously known according to statistical properties of radio channels formed from transmission antennas to a receiver. More specifically, a channel characteristic model based on Rayleigh fading which is commonly considered in wireless communication technology is known. Then, the G is calculated as the sum of channel gains based on the known channel characteristic model.

Equation (10) above is an optimization problem when there is a restriction condition, and it is a typical problem known by Variational Calculus. Therefore, $\alpha$ satisfying Equation (10) is represented as shown in Equation (11):

$$\alpha = \frac{W\left(\left(\frac{g E_s}{\sqrt{2\pi}\, \lambda N_o}\right)^2\right)}{2g E_s / N_o} \qquad (11)$$

Here, W( ) is a known Lambert W function (see R. M. Coreless, G. H. Gonnet, D. E. G. Hare, D. J. Jerrey, and D. E. Knuth, "On The Lambert W Function," Advances in Computational Mathematics, vol. 5, pp. 329-359, 1996), and is defined in Equation (12) as:

$$W(z) e^{W(z)} = z \qquad (12)$$

In addition, $\lambda$ is a constant determined so as to satisfy the restriction condition $E[\alpha]=1$ of average transmission power. Then, respective antenna weights for minimizing an average bit error rate are calculated as shown in Equation (13):

$$w_m = \frac{h_m^* \sqrt{\frac{N_o}{2 E_s} W\left(\left(\frac{E_s}{\sqrt{2\pi}\, \lambda N_o} \sum_{i=1}^{M} |h_i|^2\right)^2\right)}}{\sum_{i=1}^{M} |h_i|^2}, \quad m = 1, 2 \ldots M \qquad (13)$$

Here, $\alpha$ is calculated according to Equation (11).
In Equation (13), $$\frac{E_s}{\sqrt{2\pi}\, \lambda N_o} \text{ and } \frac{N_o}{2 E_s}$$

are constants that can be previously calculated regardless of channel gains. Therefore, the antenna weight determiner previously calculates the constants, stores the calculated constants in a memory, and calculates antenna weights using channel gains estimated upon every reception of a data symbol and the previously stored constants.

Figure 3:
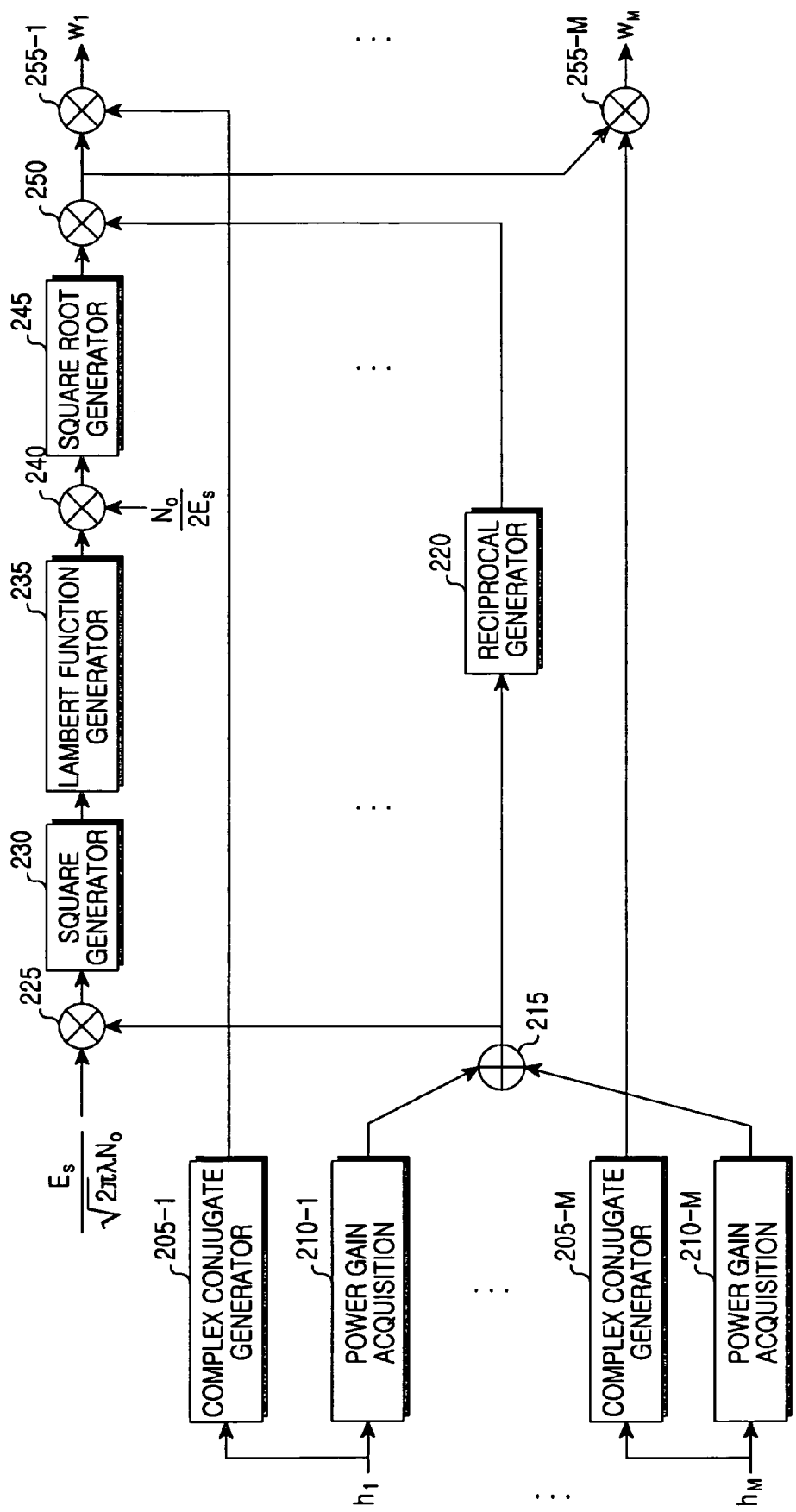
FIG. 3 is a block diagram illustrating a structure of an antenna weight determiner according to an embodiment of the present invention.

FIG. 3 is a block diagram illustrating a structure of an antenna weight determiner 190 according to an embodiment of the present invention. As illustrated, complex conjugate generators 205-1 to 205-M calculate conjugates of channel gains $h_1, \ldots, h_M$, and power gain acquisition sections 210-1 to 210-M calculate channel power gains by squaring absolute values of the channel gains. A summer 215 sums up the channel power gains, and a reciprocal generator 220 calculates a reciprocal of the sum of the channel power gains.

A multiplier 225 multiplies the sum of the channel power gains by the previously stored constant $$\frac{E_s}{\sqrt{2\pi}\, \lambda N_o},$$

a square generator 230 squares an output of the multiplier 225, and a Lambert W function generator 235 calculates a Lambert W function output for an output of the square generator 230. A multiplier 240 multiplies the Lambert W function output by the previously stored function $$\frac{N_o}{2 E_s},$$

and a square root generator 245 calculates a square root for an output of the multiplier 240. A multiplier 250 multiplies an output of the square root generator 245 by an output of the reciprocal generator 220.

Multipliers 255-1 to 255-M calculate weights $w_1, \ldots, w_M$ by multiplying the conjugates of the channel gains by an output of the multiplier 250.

Figure 4:
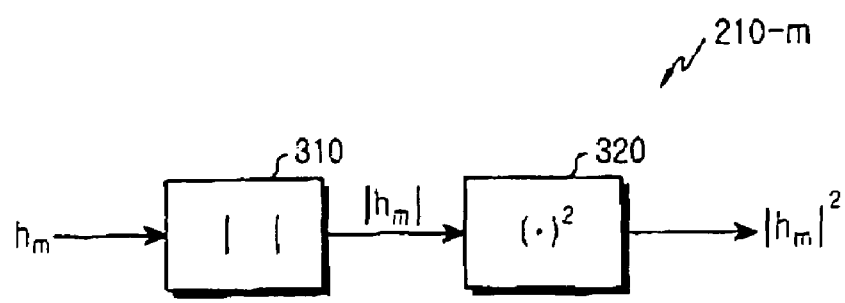
FIG. 4 is a block diagram illustrating a detailed structure of the power gain acquisition sections of the antenna weight determiner shown in FIG. 3.

FIG. 4 is a block diagram illustrating a detailed structure of the power gain acquisition sections 210-1 to 210-M shown in FIG. 3. As illustrated, in an $m^{th}$ power gain acquisition section 210-m, an absolute calculator 310 calculates an absolute value $|h_m|$ of an input channel gain $h_m$, and a square calculator 320 calculates a square $|h_m|^2$ of the absolute value and outputs the calculated square as a channel power gain.

When a radio channel for each transmission antenna is a Rayleigh fading channel, an average bit error rate when determining an antenna weight by the conventional technology is represented as shown in Equation (14):

$$P_b = \left(\frac{1-\mu}{2}\right)^M \sum_{m=0}^{M-1} \binom{M-1+m}{m} \left(\frac{1+\mu}{2}\right)^m \quad (14)$$

Here, $\mu$ is $\sqrt{\frac{E_s/N_o}{E_s/N_o + 1}}$.

An average bit error rate when determining an antenna weight according to the invention is represented as shown in Equation (15):

$$P_b = \frac{1}{(M-1)!} \int_0^\infty Q\left(\sqrt{W\left(\left(\frac{gE_s}{\sqrt{2\pi}\,\lambda N_o}\right)^2\right)}\right) g^{M-1} e^{-g} dg \quad (15)$$

Here, $\lambda$ is a constant that satisfies a restriction condition of average transmission power being equal to 1, shown in Equation (16) below.

$$E[\alpha] = \frac{N_o}{2(M-1)!E_s} \int_0^\infty W\left(\left(\frac{gE_s}{\sqrt{2\pi}\,\lambda N_o}\right)^2\right) g^{M-2} e^{-g} dg = 1 \quad (16)$$

Figure 5:
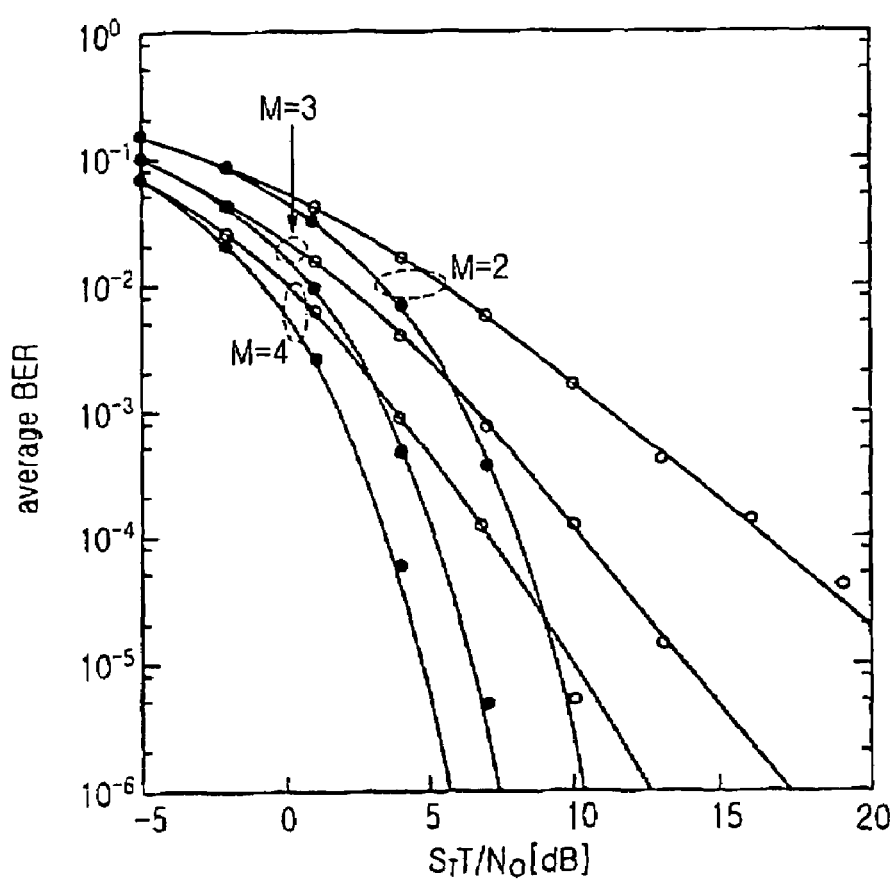
FIG. 5 illustrates a comparison between an average bit error rate of the conventional technology and an average bit error rate of the invention.

FIG. 5 illustrates average bit error rates calculated using Equation (15) and Equation (16), wherein white points represent average bit error rates according to the conventional technology, while black points represent average bit error rates according to the present invention. As illustrated, compared to the conventional antenna weight determining method, the new antenna weight determining method shows a very low average bit error rate in the same SNR environment. For example, when the number of transmission antennas is M=3, the invention shows performance improvement of about 7.4 dB in terms of an average bit error rate.

The invention has the following advantages. In the invention, a transmitter optimizes antenna weights according to characteristics of radio channels which vary according to time and space, thereby minimizing an average bit error rate of a closed-loop transmit diversity system. The reduction in an average bit error rate brings about a reduction in average power required in a transmitter, thus contributing to an increase in battery run-time and a decrease in size of a battery of the transmitter. Also, the number of transmission antennas needed to satisfy a required average bit error rate can be reduced, contributing to a decrease in cost required in installing a transmit diversity system.

While the invention has been shown and described with reference to certain preferred embodiment thereof, it will be understood by those skilled in the art that various changes in form and details may be made therein without departing from the spirit and scope of the invention as defined by the appended claims.

What is claimed is:

1. A method for determining antenna weights for M transmission antennas in a closed-loop transmit diversity system, comprising the steps of:

estimating channel gains from the M transmission antennas to a receiver; and determining antenna weights for the M transmission antennas based on the estimated channel gains, wherein the antenna weights are determined to minimize a signal error in accordance with a fixed average transmission power per transmission symbol from the M transmission antennas;

wherein the antenna weights are determined by $$w_m = \frac{h_m^* \sqrt{\frac{N_o}{2E_s} W\left(\left(\frac{E_s}{\sqrt{2\pi}\,\lambda N_o} \sum_{i=1}^M |h_i|^2\right)^2\right)}}{\sum_{i=1}^M |h_i|^2}$$

where $w_{wm}$ is an antenna weight for an $m^{th}$ transmission antenna, m is an integer between 1 and M, $h_m$ is a channel gain from an $m^{th}$ transmission antenna to a receiver, W is a Lambert W function, $E_s$ is symbol energy, $\lambda$ is a constant determined so as to fix average transmission power per transmission symbol, and $N_0$ is a variance of additive white Gaussian noise (AWGN).

2. The method of claim 1, wherein the constant $\lambda$ is determined so as to satisfy a restriction condition, $$E\left[\frac{W\left(\left(\frac{gE_s}{\sqrt{2\pi}\,\lambda N_o}\right)^2\right)}{2gE_s/N_o}\right] = 1$$

where g is the sum of channel gains of the M transmission antennas, estimated at the receiver for each symbol transmission.

3. The method of claim 1, wherein $$\frac{E_s}{\sqrt{2\pi}\,\lambda N_o} \text{ and } \frac{N_o}{2E_s}$$

are constants that can be calculated regardless of the estimated channel gains.

4. The method of claim 1, wherein the signal error denotes an average bit error rate.

5. An apparatus for determining antenna weights for M transmission antennas in a closed-loop transmit diversity system, comprising:

a channel estimator for estimating channel gains from the M transmission antennas to a receiver; and an antenna weight determiner for determining antenna weights to minimize a signal error in accordance with a fixed average transmission power per transmission symbol from the M transmission antennas;

Wherein the antenna weights are determined by $$w_m = \frac{h_m^* \sqrt{\frac{N_o}{2E_s} W\left(\left(\frac{E_s}{\sqrt{2\pi}\,\lambda N_o} \sum_{i=1}^M |h_i|^2\right)^2\right)}}{\sum_{i=1}^M |h_i|^2}$$

where $w_m$ is an antenna weight for an $m^{th}$ transmission antenna, m is an integer between 1 and M, $h_m$ is a channel gain from an $m^{th}$ transmission antenna to a receiver, W is a Lambert W function, $E_s$ is symbol energy, $\lambda$ is a constant determined so as to keep a fixed average transmission power per transmission symbol, and $N_0$ white Gaussian noise (AWGN).

6. The apparatus of claim 5, wherein the constant $\lambda$ is determined so as to satisfy a restriction condition $$E\left[\frac{W\left(\left(\frac{gE_s}{\sqrt{2\pi}\,\lambda N_o}\right)^2\right)}{2gE_s/N_o}\right] = 1$$

where g is the sum of channel gains of the M transmission antennas, estimated at the receiver for each symbol transmission.

7. The apparatus of claim 5, wherein $$\frac{E_s}{\sqrt{2\pi}\,\lambda N_o} \text{ and } \frac{N_o}{2E_s}$$

are constants that can be calculated regardless of the estimated channel gains.

8. The apparatus claim 5, wherein the signal error denotes an average bit error rate.

* * * * *